United States Patent
Takatuka et al.

(10) Patent No.: US 6,717,568 B1
(45) Date of Patent: Apr. 6, 2004

(54) METHOD OF CONTROLLING THE MOVEMENT OF A POSITION INDICATING ITEM, STORAGE MEDIUM ON WHICH A PROGRAM IMPLEMENTING SAID METHOD IS STORED, AND ELECTRONIC DEVICE

(75) Inventors: Susumu Takatuka, Tokyo (JP); Satoru Miyaki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/656,001

(22) Filed: Sep. 6, 2000

(30) Foreign Application Priority Data

Sep. 10, 1999 (JP) .......................................... 11-256566
Mar. 3, 2000 (JP) ...................................... 2000-059483

(51) Int. Cl.⁷ .............................. G09G 5/00; G09G 5/08
(52) U.S. Cl. ...................... 345/156; 345/157; 345/158; 345/810
(58) Field of Search ................................ 345/156, 158, 345/167, 173, 179, 184, 700, 763, 769, 833, 157; 341/34; 463/36, 37, 32; 78/18.05; 210/1

(56) References Cited

U.S. PATENT DOCUMENTS

| | | |
|---|---|---|
| 4,452,384 A | 6/1984 | Graber .......................... 224/314 |
| 4,493,219 A | 1/1985 | Sharp et al. |
| 4,673,919 A | 6/1987 | Kataoka |
| 4,702,401 A | 10/1987 | Graber et al. ............. 224/42.03 |
| 4,733,810 A | 3/1988 | Graber et al. ................ 224/329 |
| 4,820,129 A * | 4/1989 | Magnussen, Jr. ........... 210/101 |
| 4,924,960 A | 5/1990 | Crill ............................ 180/333 |
| 5,119,980 A | 6/1992 | Grim et al. .................. 224/315 |
| 5,164,697 A | 11/1992 | Kramer ......................... 338/69 |
| 5,169,044 A | 12/1992 | Englander .................... 224/324 |
| 5,203,484 A | 4/1993 | Englander .................... 224/324 |
| 5,349,370 A | 9/1994 | Katayama et al. |
| 5,435,475 A | 7/1995 | Hudson et al. .............. 224/324 |

(List continued on next page.)

FOREIGN PATENT DOCUMENTS

| | | |
|---|---|---|
| EP | 0 940 162 A1 | 9/1999 |
| JP | S59-161725 | 12/1984 |
| JP | S60-79423 | 5/1985 |
| JP | 1-140636 | 3/1988 |
| JP | H02-278321 | 11/1990 |
| JP | 6-38015 | 10/1992 |
| JP | H04-315216 | 11/1992 |

(List continued on next page.)

OTHER PUBLICATIONS

Maxim Integrated Products et al. (0.1 %—Accurate Signal Piezoresistive Sensor Compensation) May 1998, pp 1–12.*

Primary Examiner—Amare Mengistu
Assistant Examiner—Prabodh M. Dharia
(74) Attorney, Agent, or Firm—Frommer Lawrence & Haug LLP; William S. Frommer; Hans R. Mahr

(57) ABSTRACT

A method is disclosed for controlling the movement of a position indicating item displayed on a screen in accordance with an output signal of control means including a pressure-sensitive resistor which outputs a signal whose level varies depending upon a pressing force applied to an operating element. The method includes a signal level detection step for detecting the signal level of the signal output by the control means; a moving speed setting step for setting the moving speed of the position indicating item displayed on the screen in accordance with the signal level detected in the signal level detection step; and an item moving step for moving the position indicating item at the moving speed set in the moving speed setting step.

17 Claims, 14 Drawing Sheets

U.S. PATENT DOCUMENTS

| | | | |
|---|---|---|---|
| 5,508,717 A | 4/1996 | Miller | 345/145 |
| 5,515,040 A | 5/1996 | Lee et al. | 340/870.04 |
| 5,582,044 A | 12/1996 | Bolich | 70/58 |
| 5,607,064 A | 3/1997 | Fourel | 211/5 |
| 5,624,063 A | 4/1997 | Ireland | 224/324 |
| 5,640,152 A | 6/1997 | Copper | 340/825.54 |
| 5,659,334 A | 8/1997 | Yaniger et al. | 345/156 |
| 5,762,248 A | 6/1998 | Englander et al. | 224/324 |
| 5,790,105 A * | 8/1998 | Yoshikawa | 178/18.05 |
| 5,832,296 A | 11/1998 | Wang et al. | 395/823 |
| 5,973,668 A * | 10/1999 | Watanabe | 345/156 |
| 6,004,210 A * | 12/1999 | Shinohara | 463/36 |
| 6,171,191 B1 | 1/2001 | Ogato et al. | |
| 6,208,271 B1 | 3/2001 | Armstrong | |
| 6,219,032 B1 * | 4/2001 | Rosenberg et al. | 345/157 |
| 6,322,448 B1 * | 11/2001 | Kaku et al. | 463/32 |
| 6,347,997 B1 * | 2/2002 | Armstrong | 463/37 |
| 6,380,923 B1 * | 4/2002 | Fukumoto et al. | 345/156 |
| 6,388,655 B1 * | 5/2002 | Leung | 341/34 |

FOREIGN PATENT DOCUMENTS

| | | |
|---|---|---|
| JP | H05-29097 | 2/1993 |
| JP | H05-55503 | 7/1993 |
| JP | H07-302159 | 11/1995 |
| JP | H08-44495 | 2/1996 |
| JP | H08-84076 | 3/1996 |
| JP | 08-084076 | 3/1996 |
| JP | 3040155 | 10/1996 |
| JP | 09-204274 | 5/1997 |
| JP | H10-295937 | 11/1998 |
| TW | 191945 | 10/1992 |
| TW | 288636 | 10/1996 |

* cited by examiner

METHOD OF CONTROLLING THE MOVEMENT OF A POSITION INDICATING ITEM, STORAGE MEDIUM ON WHICH A PROGRAM IMPLEMENTING SAID METHOD IS STORED, AND ELECTRONIC DEVICE

FIELD OF THE INVENTION

The present invention relates to a method of controlling the movement of a position indicating item displayed on a screen in accordance with an output signal of control means including a pressure-sensitive resistor which outputs a signal whose level varies depending upon a pressing force applied to an operating element, a computer-readable storage medium on which a computer-executable program for implementing the method of controlling the movement of a position indication item is stored, and an electronic device including such a program.

BACKGROUND OF THE INVENTION

Electronic devices such as a video game machine generally include a main unit connected to a television set used as a display and a control means such as a controller connected via a cable to a the main unit.

The main unit includes a disk drive for reading a game program stored on a storage medium such as an optical disk, an image processing apparatus for displaying a character together with a background image on the screen of the television set in accordance with the game program stored on the storage medium, and a storage device for storing the progressive status of a game.

The control means includes a plurality of control buttons which are operated by a user in various manners to control the motion of a character displayed on the screen of the television set connected to the main unit of the video game machine. One known controller for use in such a video game machine includes a direction command button in a cruciform or circular form disposed on the left side of the upper surface of the controller and also includes a plurality of multi-purpose buttons disposed on the right side.

When a game program is executed by such a video game machine, an initial screen is displayed so that a user can select whether the game program is executed from its beginning or continued from the state indicated by the game status data stored in the storage device. When the game program is executed from its beginning, a screen for registering a user name or the like to identify the game status data to be stored in the storage device is displayed. Furthermore, when the game program is being executed, a screen for selecting items used by a character is displayed.

Via such a screen, the user can start the game program in a desired state or can select an item used by a character by operating various buttons disposed on the controller so as to move a position indicating item such as a pointer or a cursor and select one of options displayed on the screen.

However, the conventional control buttons such as the direction command button and the multi-purpose button disposed on the control means are designed to output a digital signal having either a high or low level. Therefore, in order to move the position indicating item to a desired menu option using the direction command button or the like, it is required to operate the direction command button as many times as there are menu options. In particular, when a user name or the like is registered in the storage device via the initial game screen by selecting kana characters from characters displayed on the screen using the conventional control means, it is required to operate the direction command button a large number of times. Thus the user has to perform a troublesome operation for selection.

SUMMARY OF THE INVENTION

It is an object of the present invention to provide a method of controlling the movement of a position indicating item displayed on a screen so as to quickly move it in accordance with an output signal of control means including a pressure-sensitive resistor thereby making it easier to make a selection with the position indication item. It another object of the present invention to provide a computer-readable storage medium on which a program for implementing such a method is stored. It is still another object of the present invention to provide an electronic device including such a program.

According to an aspect of the present invention, to achieve the above objects, there is provided a method of controlling the movement of a position indicating item displayed on a screen in accordance with an output signal of control means including a pressure-sensitive resistor which outputs a signal whose level varies depending upon a pressing force applied to an operating element, the method comprising: a signal level detection step for detecting the signal level of the signal output by the control means; a moving speed setting step for setting the moving speed of the position indicating item displayed on the screen in accordance with the signal level detected in the signal detection step; and an item moving step for moving the position indicating item at the moving speed set in the moving speed setting step.

Herein, the position indicating item refers to an item which indicates one of menu options displayed on a screen thereby allowing a user to specify a desired option. Examples of such a position indicating item include a cursor and a pointer displayed on an initial screen of a game program or displayed when the game program is being executed. The position indicating item may also be realized by highlighting a particular one of the plurality of options displayed on the screen.

The method of controlling the movement of the position indicating item may be implemented by a program stored on a storage medium on which a game program is stored. Furthermore, the respective steps described above may also be implemented by signal level detection means, moving speed setting means, and item movement control means, disposed in an electronic device such as a video game machine including a processing device and a memory device. In this case, the respective means may be realized by a program stored in a memory device such as a ROM (Read Only Memory) such that when the electronic device is powered on, an operating system is first loaded on the processing device and the above-described means are then loaded.

In the present invention, the level of the signal output by the control means including the pressure-sensitive resistor is detected in the signal level detection step, and the moving speed of the position indicating item is set depending upon the signal level detected in the signal level detection step. That is, the moving speed of the position indicating item is changed depending upon the pressing force applied to an operating element of the control means so that the position indicating item can be quickly moved in the item moving step thereby making it easier to make a selection with the position indicating item.

Preferable, the method of controlling the movement of a position indicating item further comprises a signal determining step for determining, when one of options displayed on the screen is selected by moving the position indicating item, whether the signal whose signal level has been detected in the signal level detection step should be converted to a two-level signal, in accordance with the number of options displayed on the screen.

The signal determining step may convert the signal whose signal level has been detected in the signal level detection step into a two-level signal depending upon whether the signal level detected by the signal level detection step is higher than a predetermined threshold value.

That is, when a small number of options are displayed on the screen, the position indicating item may be moved by a turning-on/off operation using the control means in a similar manner as with the conventional control means, without causing a problem. Therefore, the signal determining step makes it possible to skip the moving speed setting step for setting the moving speed of the position indicating item thereby allowing simplification of the process of controlling the movement of the position indicating item.

The signal output by the control means is preferably a digital signal obtained by converting an analog signal output by the pressure-sensitive resistor.

It is desirable that the control means include an A/D converter for converting the analog signal output from the pressure-sensitive resistor to a digital signal.

If the control means outputs a signal in digital form, the signal output from the control means becomes insensitive to noise. As a result, it becomes possible for the signal level detection step to accurately detect the signal level corresponding to the pressing force applied to the operating element, and it further becomes possible to move the position indicating item at a correct moving speed depending upon the pressing force applied to the operating element.

Furthermore, the signal output by the control means is preferably a signal obtained by correcting the upper and lower limits of an analog signal output by the pressure-sensitive resistor to corresponding calibrated levels.

This ensures that the output signal level precisely corresponds to the pressing force regardless of a variation or a deviation in the resistance of the pressure-sensitive resistor.

According to another aspect of the present invention, there is provided a computer-readable storage medium including a computer-executable program stored thereon, the program implementing a method of controlling the movement of a position indicating item displayed on a screen in accordance with an output signal of control means including a pressure-sensitive resistor which outputs a signal whose level varies depending upon a pressing force applied to an operating element, the program comprising: a signal level detection step for detecting the signal level of a signal output by the control means; a moving speed setting step for setting the moving speed of the position indicating item displayed on the screen in accordance with the signal level detected in the signal detection step; and an item moving step for moving the position indicating item at the moving speed set in the moving speed setting step.

Preferably, the program stored on the storage medium further comprises a signal determining step for determining, when one of options displayed on the screen is selected by moving the position indicating item, whether the signal whose signal level has been detected in the signal level detection step should be converted to a two-level signal, in accordance with the number of options displayed on the screen.

According to still another aspect of the present invention, there is provided an electronic device comprising: control means including a pressure-sensitive resistor which outputs a signal whose level varies depending upon a pressing force applied to an operating element; signal level detection means for detecting the signal level of the signal output by the control means; moving speed setting means for setting the moving speed of the position indicating item displayed on the screen in accordance with the signal level detected by the signal detection means; and item moving means for moving the position indicating item at the moving speed set by the moving speed setting means.

Preferably, the electronic device further comprises signal determining means for determining whether the signal whose signal level has been detected by the signal level detection means should be converted to a two-level signal, in accordance with the signal level and the number of options to be selected with the position indicating item.

Preferably, the pressure-sensitive resistor has a conduction characteristic which varies depending upon an applied pressure. Alternatively, the pressure-sensitive resistor may include a resistor and a conductive element the contact area between which varies depending upon an applied pressure.

DESCRIPTION OF THE PREFERRED EMBODIMENTS

An embodiment of the present invention is described below with reference to the accompanying drawings.

Figure 1:
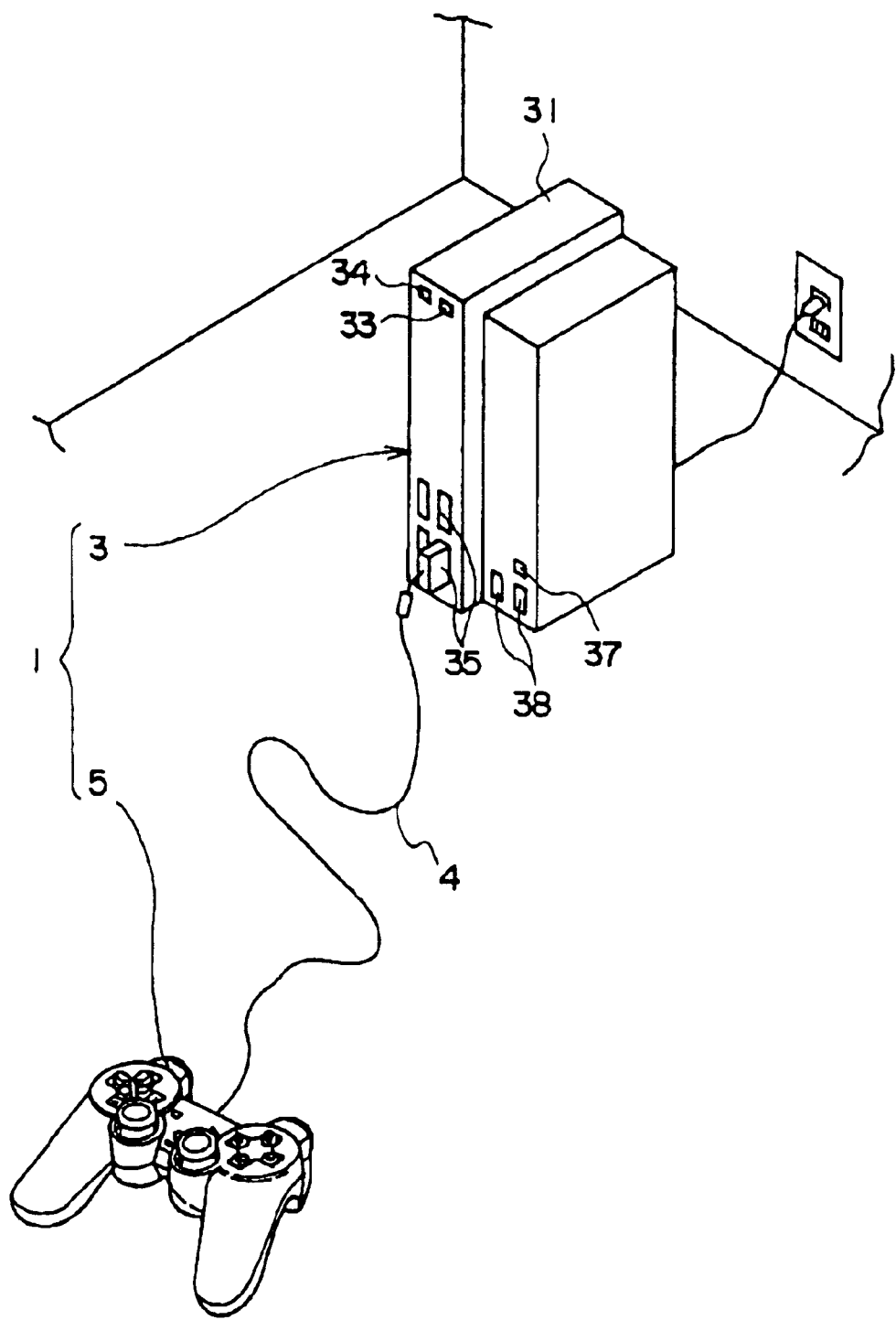
FIG. 1 is a perspective view illustrating the appearance of an electronic device of an embodiment of the present invention.

FIG. 1 illustrates an embodiment of a video game machine 1 according to the present invention. As shown in FIG. 1, the video game machine 1 includes a main unit 3 placed in a vertical position and connected to a display such as a television set (not shown) and also includes a controller 5 serving as control means connected to the main unit 3 via a cable 4.

The main unit 3 has an enclosure 31 in which various parts of the video game machine 1 are disposed. A disk drive 32 for reading a game program or the like from an optical disk such as a CD-ROM or a DVD-ROM is disposed on the upper and right side of the front surface of the enclosure 31. The disk drive 32 includes a disk tray 32A which moves out of the enclosure 31 when a tray switch 33 disposed to the right of the disk driver 32 is operated, so that an optical disk can be loaded on the disk tray 32A. A power switch 34 is disposed on the front panel at a location above the tray switch 33.

Figure 2:
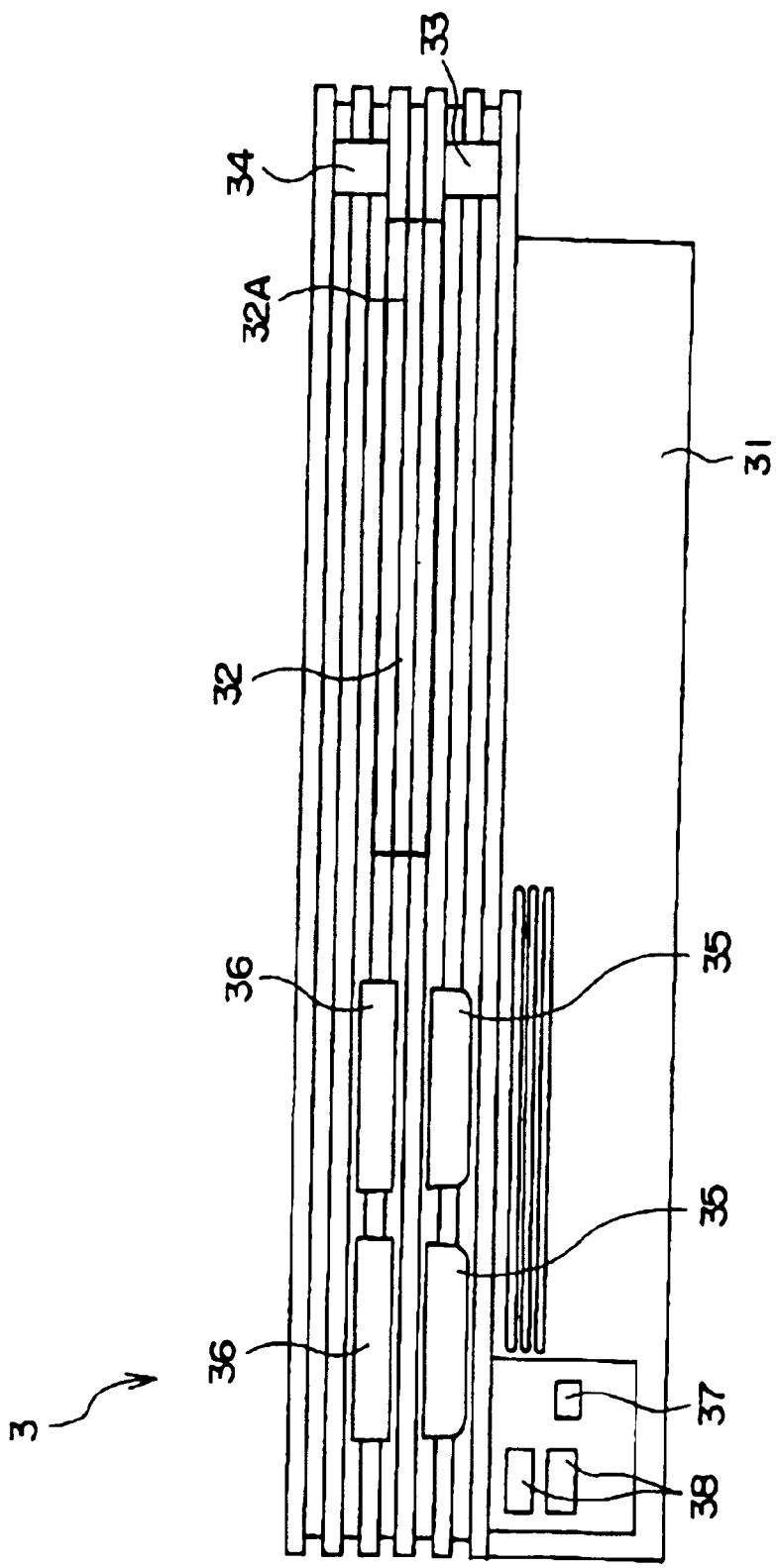
FIG. 2 is a front view of the main unit of a game machine of the electronic device.

Two controller connection units 35 for connecting the controller 5 via the cable 4 are disposed on the upper and left side of the front surface of the enclosure 31 shown in FIG. 2. Furthermore, two card slots 36 are disposed on the front surface at locations above the corresponding controller connection units 35. A user may insert a memory card serving as a storage device into one of card slots 36 to save the data representing the game progress status in the memory card.

Two different types of external device connection terminals 36 and 38 are disposed on the lower and left side of the front surface of the enclosure 31 as shown in FIG. 2.

The external device connection terminal 37 is a terminal according to the IEEE1394 standard and may be used to connect a device such as a digital camera or a video deck to transfer image or audio data from the connected device to the main unit 3.

The external device connection terminal 38 is a terminal according to the USB (Universal Serial Bus) standard and may be used to connect an input device such as a keyboard, a pointing device such as a mouse, a printer, or an external storage device such as a magnetooptical disk drive. Although not shown in the figures, the video game machine 1 of the present embodiment also includes a PCMCIA (Personal Computer Memory Card International Association) slot according to the PCMCIA standard and an optical communication terminal according to the IrDA (Infrared Data Association) standard, disposed on the back surface of the video game machine 1.

In the inside of the enclosure 31, there are disposed, in addition to the above-described disk drive 32, a main board, an input/output control board, and a power supply unit for supplying electric power to various parts, although they are not shown in the figures.

The main board includes a control system including a CPU (Central Processing Unit) and peripheral devices thereof, a graphic system including an image processor for writing a graphic image, and a sound system including an audio processor for generating a sound such as a musical sound or a sound effect. The main board is disposed in a bottom region in the enclosure 31 shown in FIG. 2.

The control system includes the CPU, a peripheral device controller for controlling interrupt handling and direct memory access transfer operation, a random access memory (RAM) serving as a main memory, and a read only memory (ROM) in which a program such as an operating system for controlling various parts such as the graphic system and the sound system is stored.

The CPU controls the entire video game machine 1 by executing the operating system stored in the ROM. An example of the CPU is a 128-bit RISC (Reduced Instruction Set Computer) CPU.

The graphic system includes the image processor for generating a graphic image in accordance with a graphic image write command given by the CPU and also includes a frame buffer for storing an image generated by the image processor. The image processor writes an image with polygon elements into the frame buffer in accordance with a graphic image write command given bye CPU. The image processor can write up to 75 million polygons each second.

The sound system includes the audio processor for generating a sound such as BGM (back ground music) or a sound effect in accordance with a command given by the CPU and also includes a sound buffer for storing waveform data generated by the audio processor.

The input/output board includes an optical disk controller for controlling an optical disk on which an application program or the like is stored, and also includes a communication controller for controlling the inputting of a command signal issued by a user using the controller 5, the outputting a signal to the controller, and the inputting/outputting of data from/into a memory card placed in the card slot 36. The input/output board is disposed together with the main board in the bottom region in the enclosure.

The optical disk controller includes, for example, a decoder for decoding a program or data stored together with an additional error correction code on an optical disk, and also includes a buffer for temporarily storing data read by the disk drive 32 thereby allowing data to be read from an optical disk at a higher speed.

The communication controller is electrically connected to the controller connection unit 35 and also to the card slot 36 so that when a user operates the controller 5, the communication controller controls the inputting/outputting of a signal from/to the controller and also the inputting/outputting of data from/to a storage area of a memory card. In addition to the controller 5, the communication controller is also connected to the external device connection terminals 37 and 38 so as to control the inputting/outputting of a signal from/to an external device connected to the external device connection terminal 37 or 38.

Figure 3:
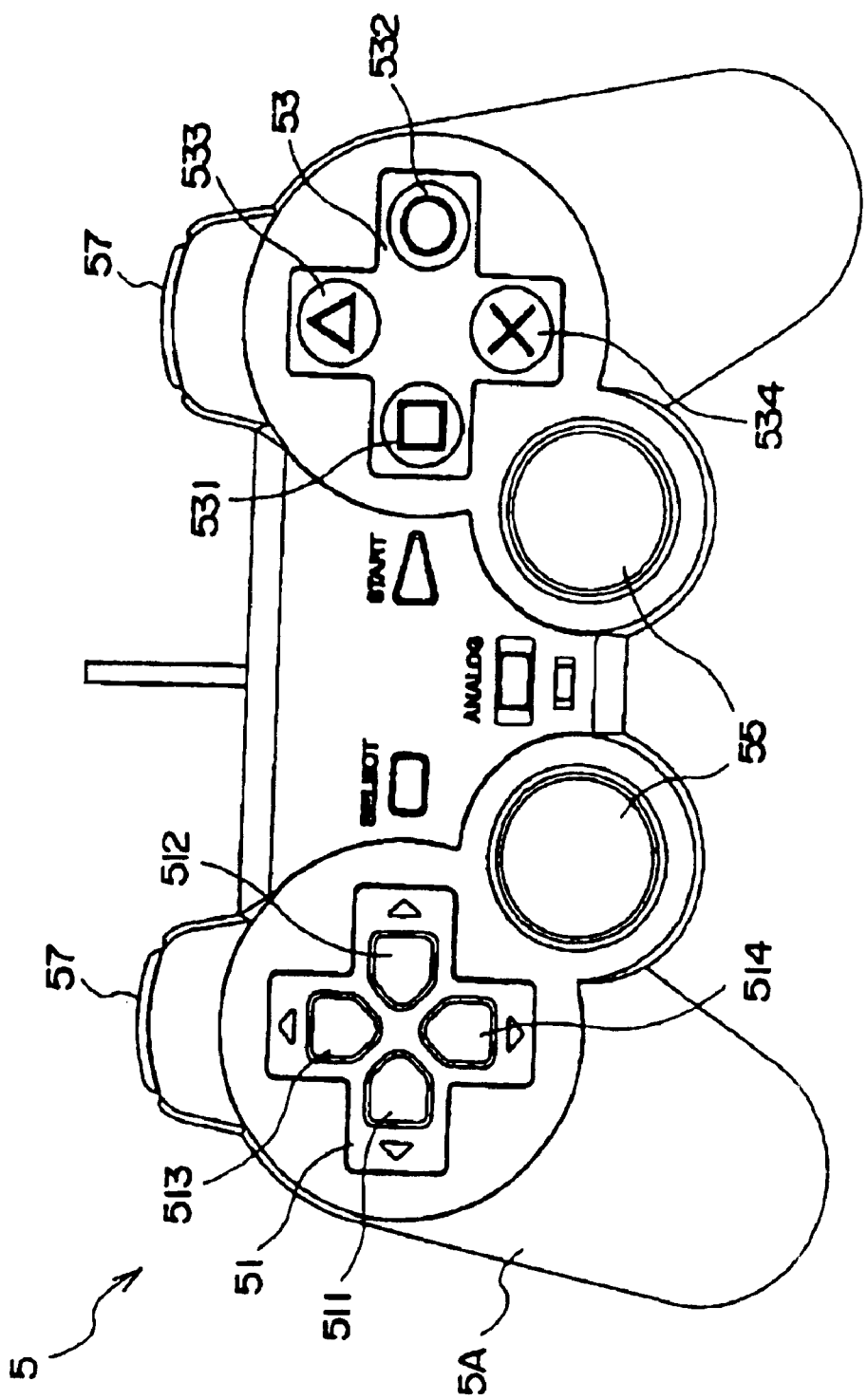
FIG. 3 is a top view of control means included in the electronic device of the embodiment of the present invention.

As shown in FIG. 3, the controller includes a first control unit 51, a second control unit 53, third control units 55, and a fourth control units 57, wherein the first, second, and third control units are disposed on the upper surface of the main part 5A and the fourth control units 57 are disposed on the side fact of the main part 5A.

The first control unit 51 includes first to fourth control switches 511 to 514 disposed in the form of a cross. The first control unit 51 serves as a direction command button for moving a character displayed on the screen of the television set during a game program. More specifically, if a first control switch 511 is pressed, a character is moved to left on the screen. If a second control switch 512 is pressed, the character is moved to right on the screen. Similarly, the character is moved up or down in response to pressing of a third switch 513 or a fourth switch 514.

Similarly, the second control unit 53 includes fifth to eighth control switches 531 to 534 serving as multi-purpose buttons whose function is set by a game program stored on an optical disk.

The third control units 55 serve as analog controllers used in various manners depending upon the game program. The fourth control units 57 serve as auxiliary buttons for supplementing the first to third control units 51, 53, and 55.

The first to fourth control switches 511 to 514 disposed on the first control unit 51 and the fifth to eighth control switches 531 to 534 disposed on the second control unit 53 are used not only to control the motion of a character during the execution of a game program but also to make a selection via a menu displayed on the initial screen of the game program. For example, in order to select an option such as "Start the Game from the Beginning" or "Load the Recorded Data and Continue the Game" from the menu, the position indicating item such as a cursor is moved with the first control unit 51 and a selection is made with the second control unit 53.

The first to fourth control switches 511 to 514 disposed on the fist control unit 51 and the fifth to eighth switches 531 to 534 disposed on the second control unit 53 are each formed of a pressure-sensitive resistor serving as a switching element. More specifically, the control switches 531 to 534 each include a cylindrical-shaped operating element 61, an elastic element 63, and a pressure-sensitive resistor 65. On the other hand, the control switches 511 to 514 are operated by a single operating element in the form of a cross which is not separated into individual operating elements unlike the operating elements 61 shown in FIG. 4. However, the elastic element and the pressure-sensitive resistor of the control unit 51 have structures similar to those of the elastic element 63 and the pressure-sensitive resistor 65 shown in FIG. 4. Thus, it should be understood that the cross-shaped operating element of the control switches 511 to 514 also works in a similar manner to the operating element 61 shown in FIG. 4, although only the operating element 61 is described in the following discussion.

The operating element 61 is fitted in a main element 5A such that the top portion of the operating element 61 is exposed above the upper surface of the main element 5A and such that the operating element 61 is movable in a direction along the axis of the operating element 61. The elastic element 63 is formed of insulating rubber or the like and has an upwardly protruding part 63A. The upper surface of the upwardly protruding part 63A of the elastic element 63 is in contact with the lower end of the operating element 61. When the operating element 61 is pushed down in the axial direction, the sloped side face of the protruding part 63A of the elastic element 63 is deformed, and the upper surface of the protruding part 63A sinks down together with the operating element 61. If the pressing force imposed upon the operating element 61 is removed, the sloped side face of the protruding part 63A elastically returns from the deformed shape into its original shape while pushing up the operating element 61. Thus, the elastic element 63 serves as urging means for restoring the operating element 61 to the original position from the pushed-down position.

A plurality of pressure-sensitive resistors 65 are formed on a thin insulating sheet 65A such that each pressure-sensitive resistor 65 and the corresponding operating element 61 and the upper surface of the protruding part 63A of the corresponding elastic element 63 are substantially aligned on the same vertical line whereby the pressing force imposed upon the operating element 61 is applied to the corresponding pressure-sensitive resistor 65 via the protruding part 63A of the elastic element 63.

The pressure-sensitive resistor 65 may be formed of, for example, pressure-sensitive conductive rubber. The pressure-sensitive resistor 65 includes electrodes 65B and 65C disposed at symmetrical locations on the insulating sheet 65A. The electrical resistance between the electrodes 65B and 65C varies depending upon the force applied to the pressure-sensitive resistor 65.

An example of pressure-sensitive rubber is non-conductive rubber containing conductive particles such as carbon or metal particles. When the pressure-sensitive conductive rubber is compressed by a pushing-down pressure, the density of conductive particles increases and thus the overall resistance decreases. If the pushing-down pressure is removed, the pressure-sensitive conductive rubber returns into the original form and the density of conductive particles returns to its original value. As a result, the overall resistance returns to the original value. More specifically, when the pushing-down force (stress) increases from Level 1 toward Level 5 in FIG. 5, the resistance decreases as represented by a broken line, and the output voltage of the pressure-sensitive resistor 65 in a circuit shown in FIG. 10 (that is, the voltage across the pressure-sensitive conductive rubber), that is, the input voltage of a level correction unit 731 increases.

Figure 5:
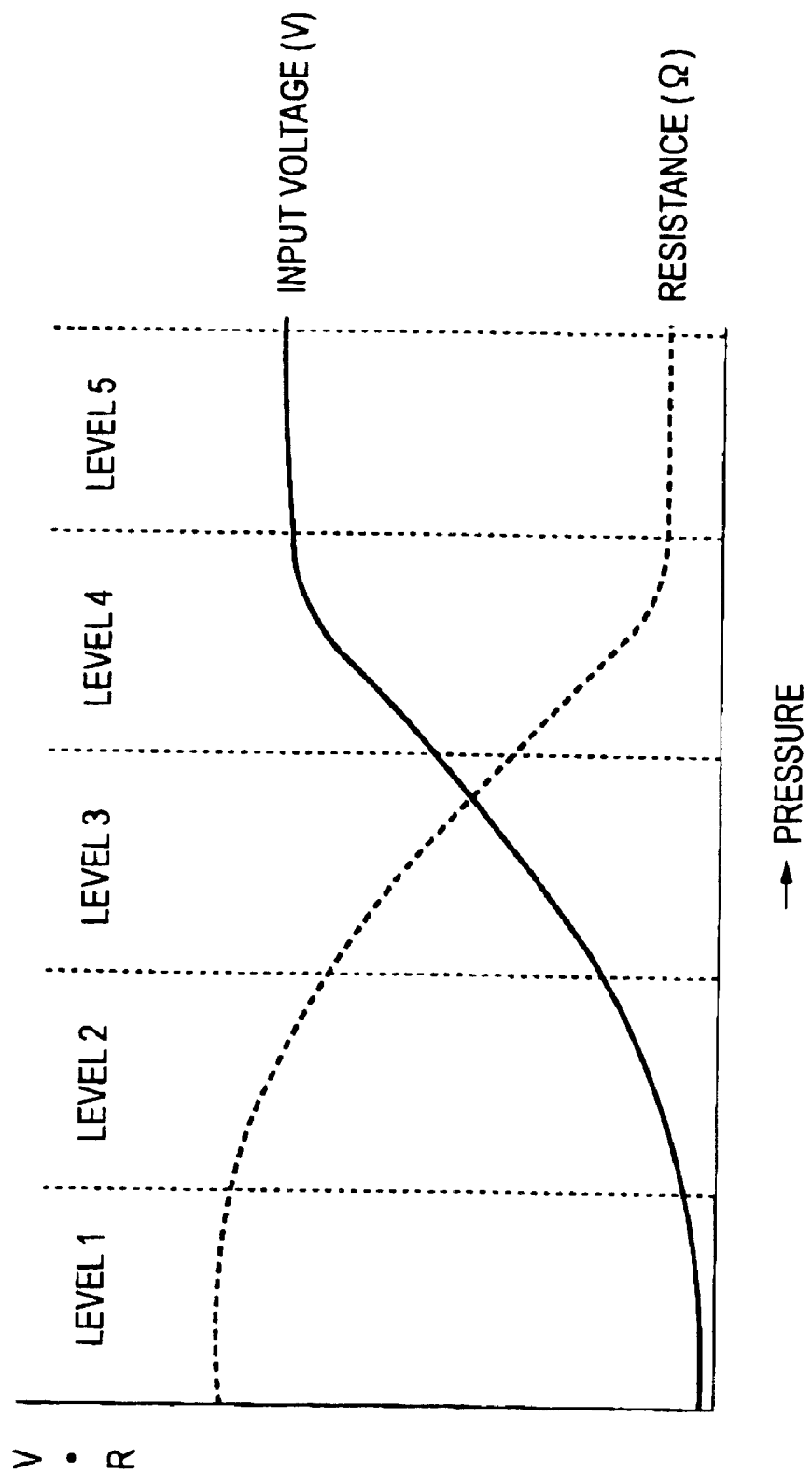
FIG. 5 is a graph illustrating an example of the dependence of the resistance of the pressure-sensitive resistor according to the embodiment upon the pressing force applied to the pressure-sensitive resistor.
Figure 6:
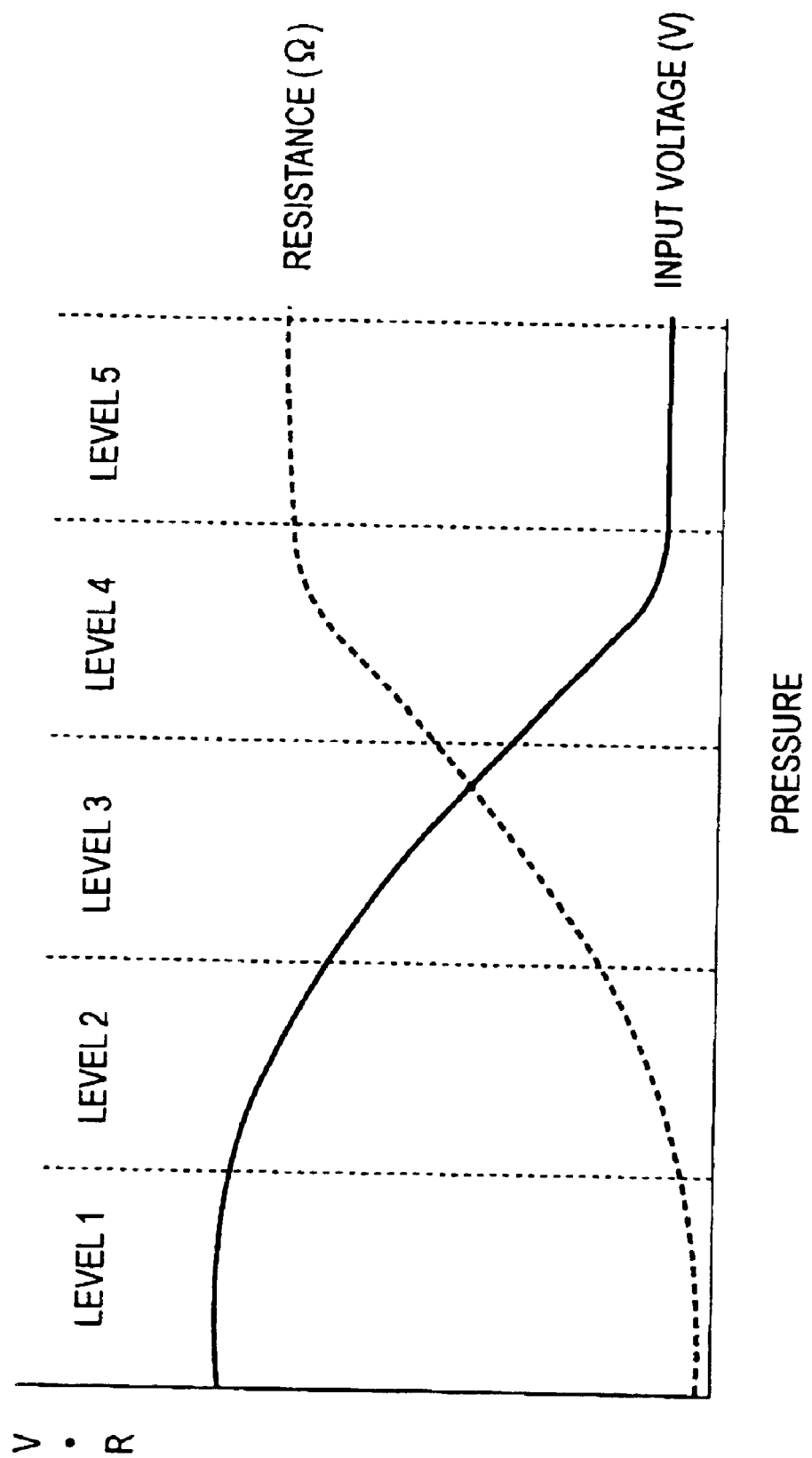
FIG. 6 is a graph illustrating another example of the dependence of the resistance of the pressure-sensitive resistor according to the embodiment upon the pressing force applied to the pressure-sensitive resistor.

FIG. 6 illustrates another example of the characteristic of a pressure-sensitive resistor 65 formed of pressure-sensitive rubber. In this example, unlike the characteristic shown in FIG. 5, the resistance increases with increasing stress imposed upon the pressure-sensitive resistor 65 caused by an applied pressing force. More specifically, when the pushing-down force increases from Level 1 toward Level 5 in FIG. 4, the resistance increases as represented by a broken line, and the output voltage of the pressure-sensitive resistor 65 in the circuit shown in FIG. 10, that is, the input voltage of the level correction unit 731 decreases. An example of such a pressure-sensitive resistor is available from such as a piezoelectric tranducer.

Figure 4:
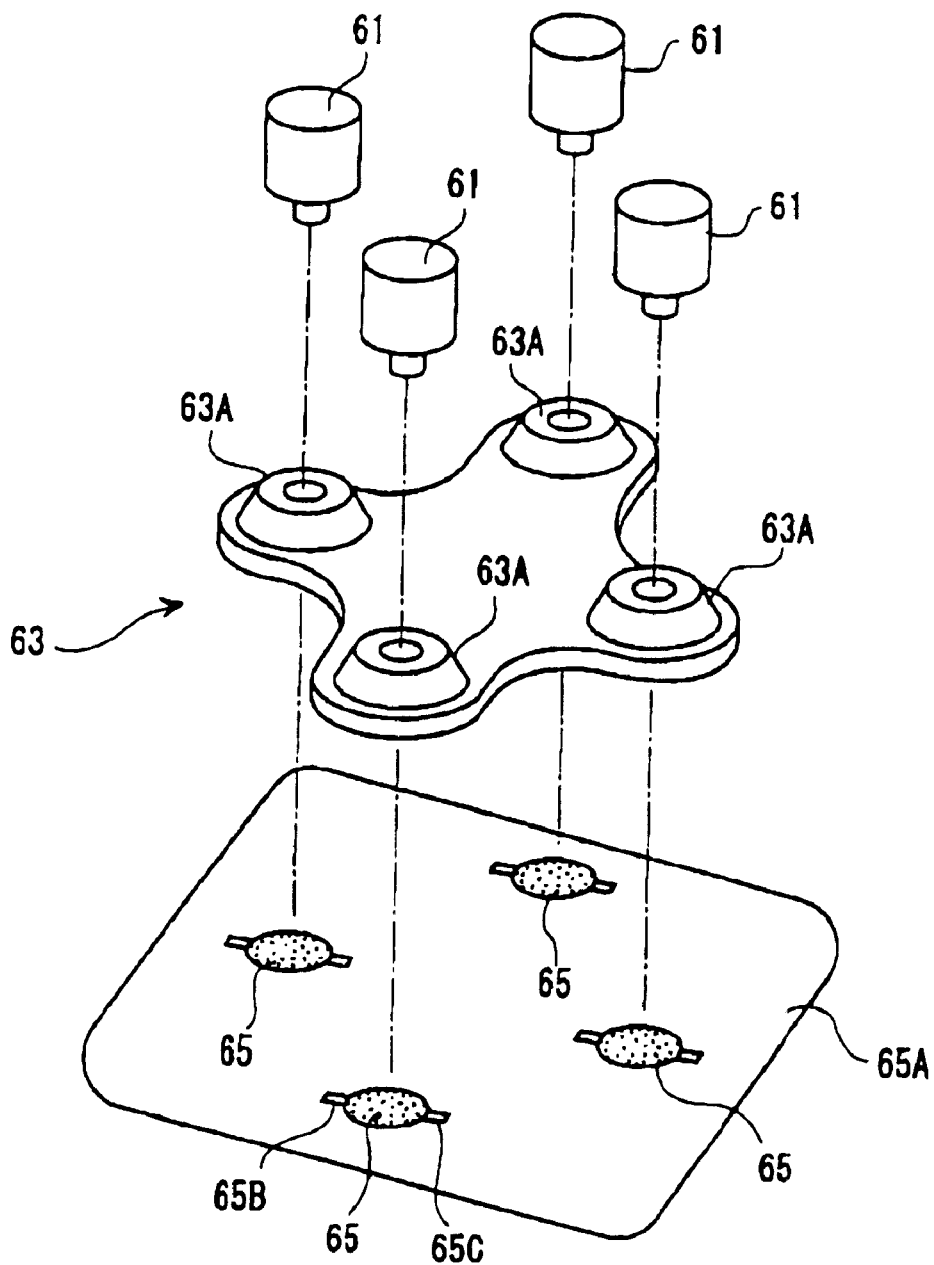
FIG. 4 is an exploded perspective view illustrating the structure of an operating element and a pressure-sensitive resistor according to the embodiment of the present invention.
Figure 7A:
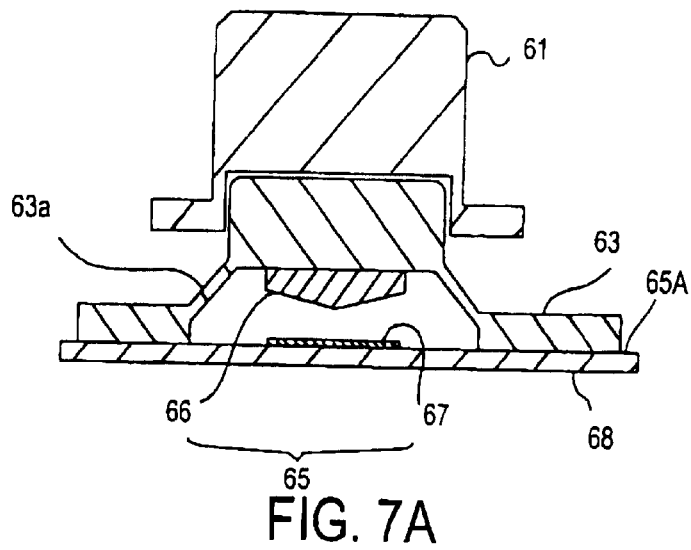
FIGS. 7A, 7B, and 7C are cross-sectional views illustrating three different states of the operating element and the pressure-sensitive resistor.

FIG. 7 illustrates an alternative analog switch having a structure different from that shown in FIG. 4. As shown in FIG. 7, the analog switch includes a push button 61 having the same function as that of the operating element 61, an elastic element 63 similar to the elastic element 63 described above, a conductive element 66, and a resistor 67 wherein the combination of the conductive element 55 and the resistor 67 provides a similar function to that of the pressure-sensitive resistor 65.

The conductive element 66 may be formed of, for example, elastic conductive rubber so as to have a convex shape whose thickness is greatest at the center. The conductive element 66 is adhesively connected to the lower surface of the upper portion of an elastic part 63a formed on the elastic element 63. The resistor 67 is disposed on an inner substrate 68 such that the resistor 67 and the conductive element 66 face each other and such that the conductive element 66 comes into contact with the resistor 67 when the push button 61 is pushed down.

Figure 7B:
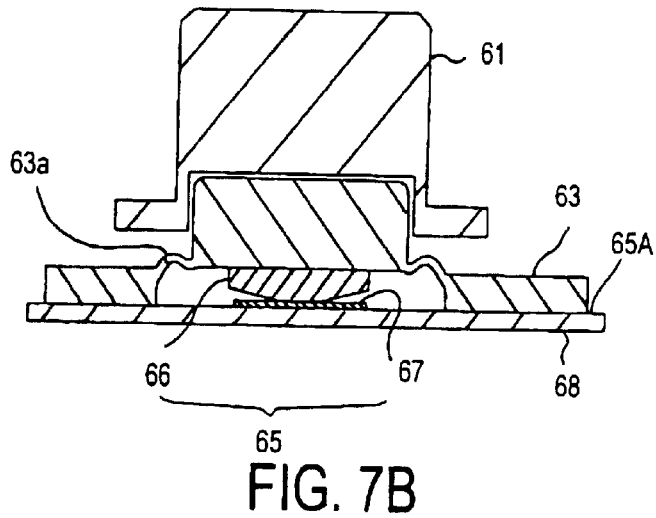
Figure 7C:
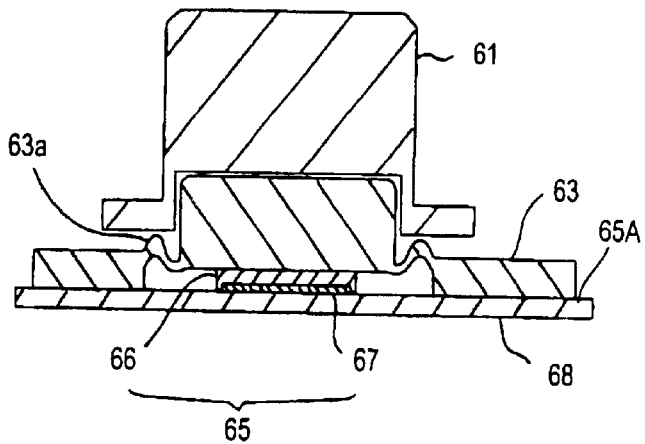

The conductive element 66 is deformed to a degree depending upon the pushing-down force applied by the push button 61 (that is, depending upon the contact pressure imposed at the contact with the resistor 67). As a result, the contact area between the conductive element 66 and the resistor 67 varies as shown in FIG. 7B or 7C. When the pushing-down force applied by the operating element 61 is weak, a surface area near the thickest portion of the conductive element 66 comes into contact with the resistor 67 as shown in FIG. 7B. If the pushing-down force applied by the operating element 61 increases, the deformed portion of the conductive element 66 extends from the thickest portion. As a result, the contract area increases.

Figure 8:
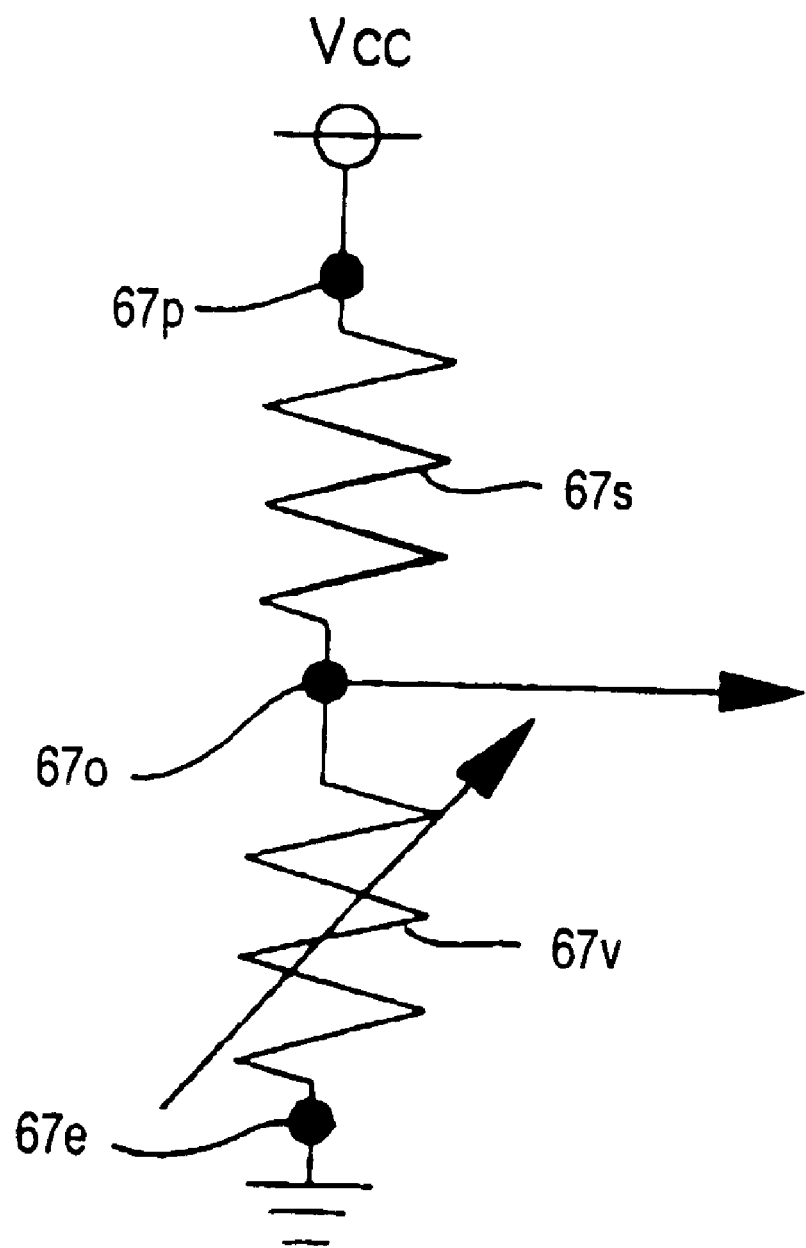
FIG. 8 is a circuit diagram illustrating the pressure-sensitive resistor connected to a power supply line.

FIG. 8 is a circuit diagram illustrating the resistor 67, the conductive element 66, and associated elements. In FIG. 8, variable resistor 67*v* corresponds to the combination of the conductive element 66 and the resistor 67 shown in FIG. 7. A fixed resistor 67*s* is connected to the resistor 67 although it is not shown in FIG. 7. A voltage is applied to the variable resistor 67*v* and the fixed resistor 67*s* which are connected in series. More specifically, the voltage is applied between electrodes 67*p* and 67*e*.

The resistance of the variable resistor 67*v* corresponding to the combination of the conductive element 66 and the resistor 67 varies depending upon the area in contact with the conductive element 44. That is, when the conductive element 66 comes into contact with the resistor 67, the conductive element 66 provides a by-pass through which a current flows, and thus the part of the resistor 67 in contact with the conductive element 66 is substantially shunted. As a result, the resistance of the resistor 67 decreases. Herein, note that the resistance of the resistor 67 decreases with the increasing contact area between the conductive element 66 and the resistor 67.

Because the voltage applied between the electrodes 67*p* and 67*e* is divided by the fixed resistor 67*s* and the variable resistor 67*v* whose resistance varies in response to the pressing force applied to the operating element, the voltage output at the output terminal 67*o* between the variable resistor 67*v* and the fixed resistor 67*x* decreases with the reducing resistance of the variable resistor 67*v* and, conversely, increases with the increasing resistance of the variable resistor 67*v*.

Figure 9:
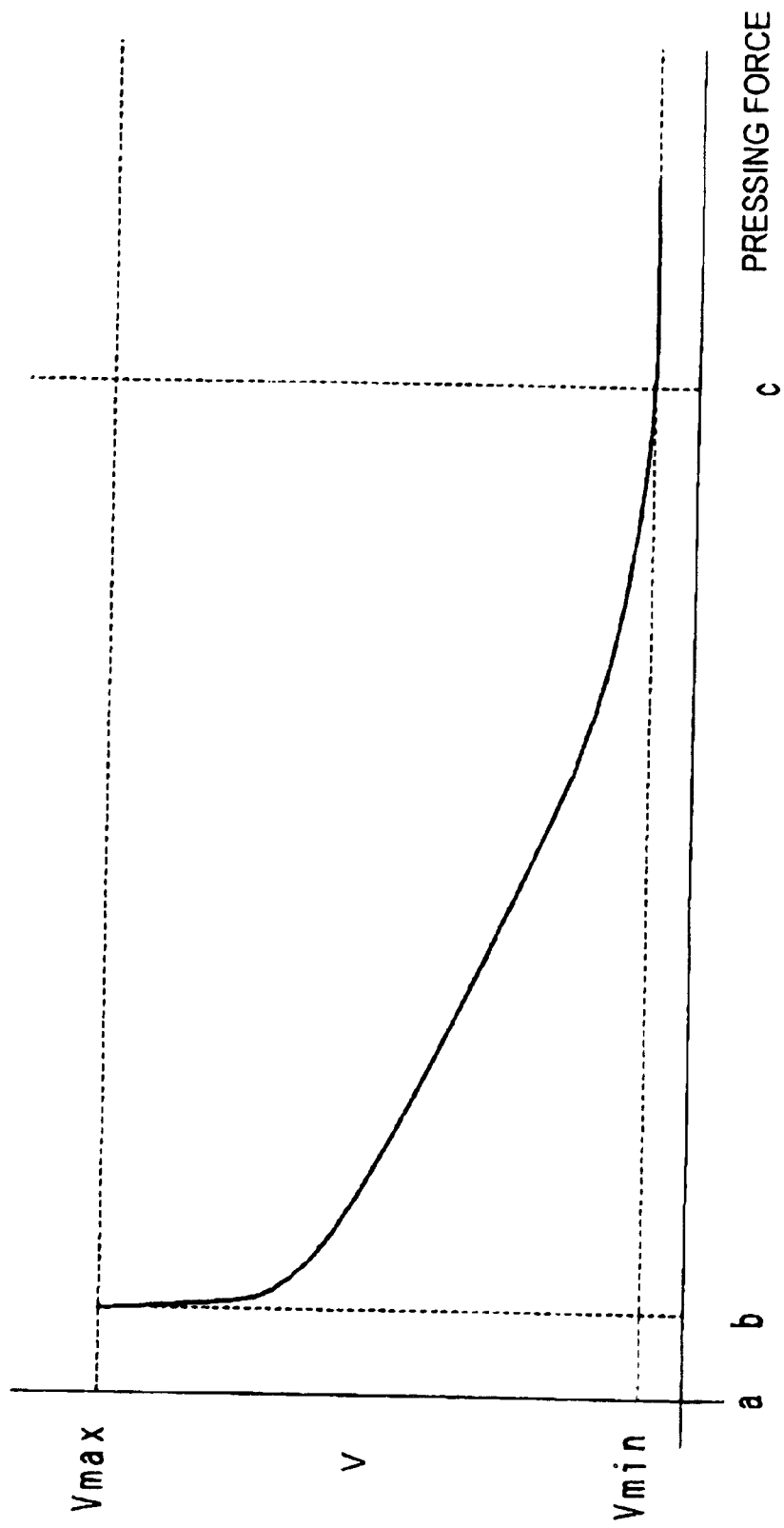
FIG. 9 is a graph illustrating a voltage output by the pressure-sensitive resistor shown in FIG. 7 as a function of the pressing force applied thereto.

FIG. 9 illustrates the analog signal (voltage) output at the output terminal 67*o* of the pressure-sensitive resistor consisting of the resistor 67 and the conductive element 66. When the operating element 61 is not pressed at all (point a in FIG. 9), the analog signal (voltage) output at the output terminal 40*c* has a value Vmax determined by the supply voltage Vcc applied to the resistor 67. Even if the operating element 61 is pushed down, the voltage of the analog signal is maintained at Vmax until the conductive element 66 comes into contact with the resistor 67 and thus the resistance of the variable resistor 67*v* of the resistor 67 starts to vary.

When the conductive element 66 comes into contact with the resistor 67 (point b in FIG. 9) as a result of further pushing-down of the operating element 61, the contact area between the resistor 67 and the conductive element 66 increases depending upon the pushing-down force applied to the operating element 61, and the resistance of the variable resistor 67*v* of the resistor 67 decreases. As a result, the analog signal (voltage) output at the output terminal 67*o* decreases. When the conductive element 66 is deformed to a maximum degree, the analog signal (voltage) output at the output terminal 67*oc* has a minimum value Vmin (point c in FIG. 9). Thus, in the pressure-sensitive resistor 65 constructed in the above-described manner, the resistance decreases with the increasing pressing force.

Examples of the analog switch have been described above with reference to FIGS. 4 and 7, and it has been described that the pressure-sensitive resistor 65 in the analog switch may be formed of an element having various pressure-resistance characteristics such as those described in FIGS. 5, 6, and 9.

Figure 10:
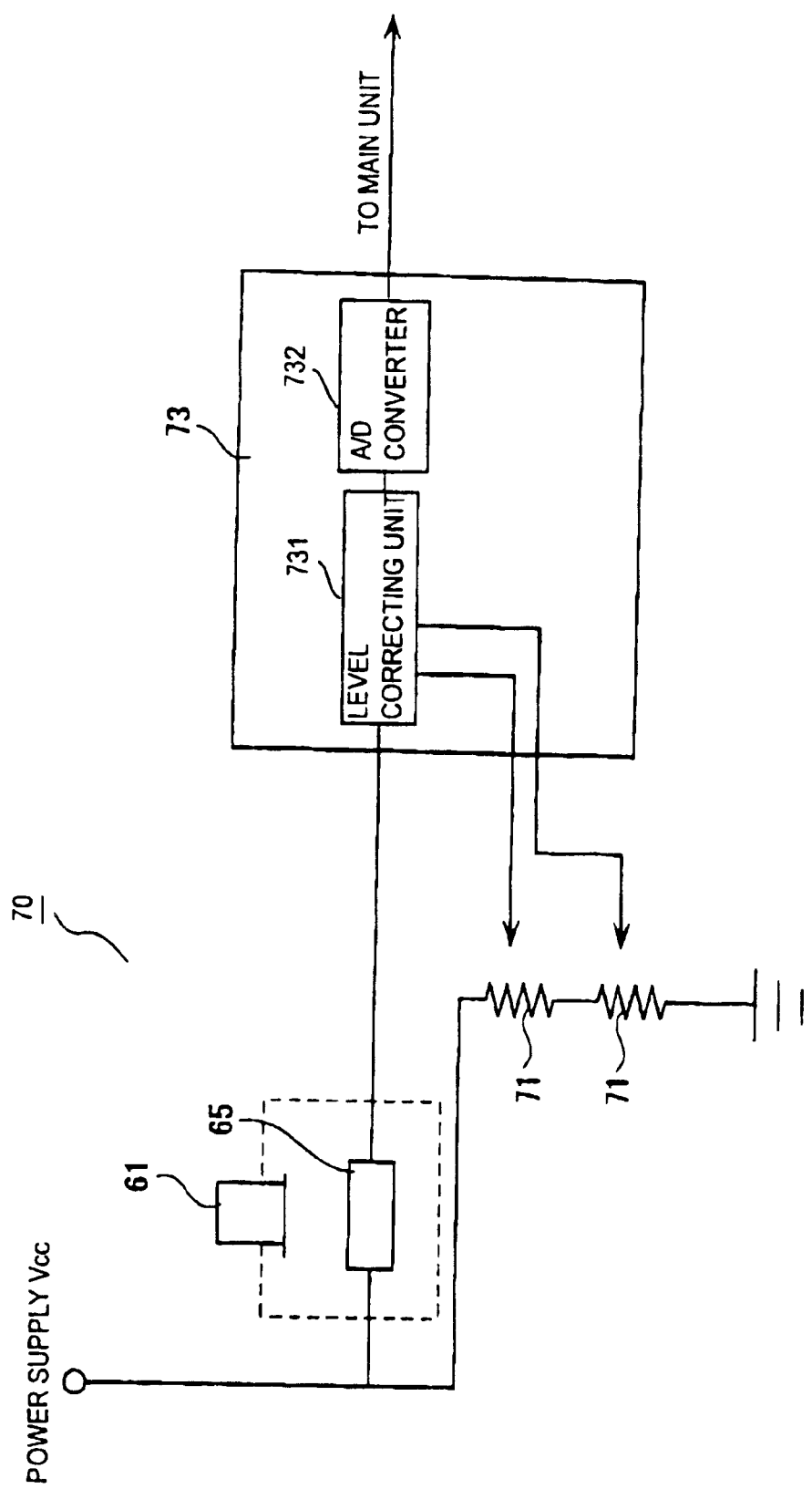
FIG. 10 is a circuit diagram illustrating a signal processing circuit in the control means according to the embodiment.

The change in the resistance corresponding to the change in the pressing force applied to the pressure-sensitive resistor 35 is electrically processed by a signal processing circuit 70 disposed in the controller 5 as shown in FIG. 10.

The signal processing circuit 70 includes the pressure-sensitive resistor 65 described above, a series of two variable resistors 71 connected in parallel with the pressure-sensitive resistor 65, and a microcomputer 73 to which the output voltage of the pressure-sensitive resistor 65 is applied, wherein the power supply voltage Vcc is applied to one electrode of the pressure-sensitive resistor 65.

Figure 11:
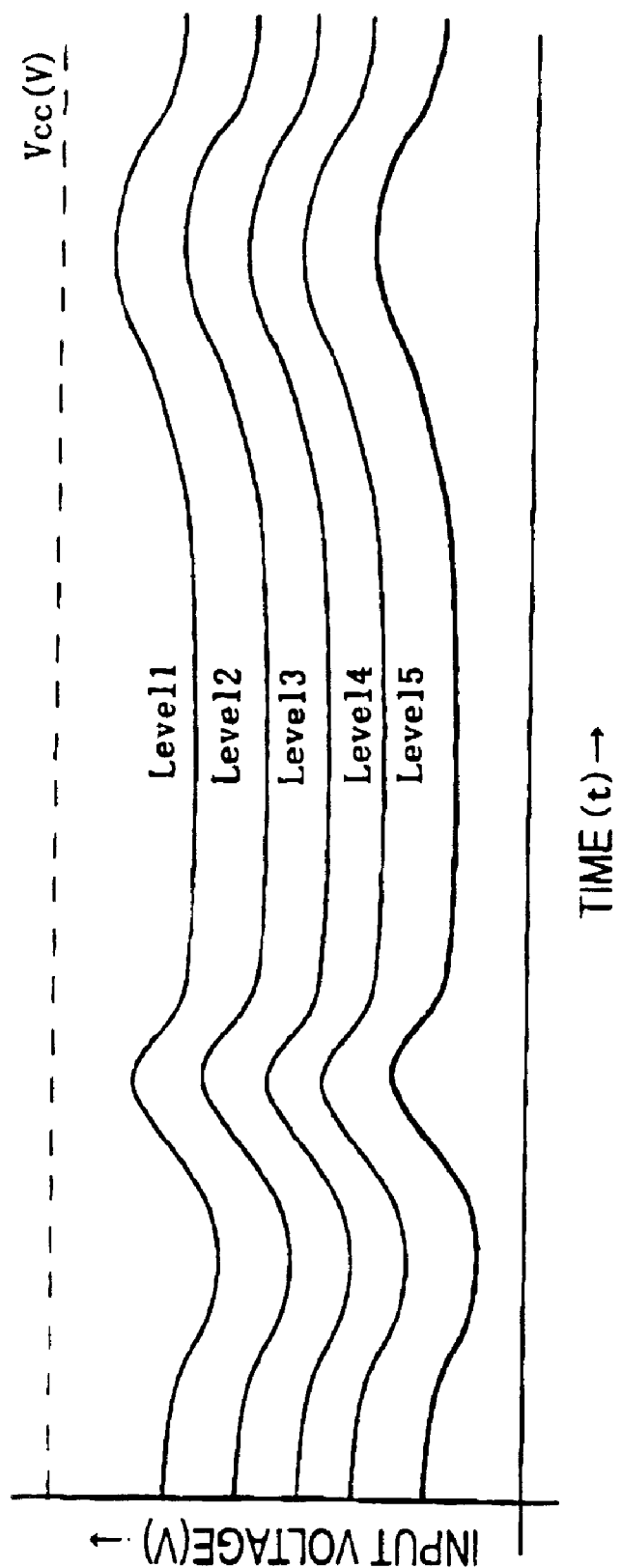
FIG. 11 is a graph illustrating a method of setting signal levels of a signal output by the control means according to the embodiment.

The microcomputer 73 includes a level correction unit 731 and an analog-to-digital (A/D) converter 732. The microcomputer 73 detects the level of a signal which is output by the pressure-sensitive resistor 65 when a maximum stress is imposed thereon by an operation performed by a user, and the microcomputer 73 divides the range between the detected signal level and the power supply voltage Vcc or ground voltage so as to define a plurality of signal levels corresponding to the pressing force applied to the pressure-sensitive resistor 65. More specifically, as shown in FIG. 11, the microcomputer 73 first detects a voltage which is output by the pressure-sensitive resistor 65 when a maximum stress is imposed, and the microcomputer 73 sets Level 5 (maximum level) in FIG. 6 to be equal to the detected signal level. The microcomputer 73 then defines signal levels, Level to Level 4, by dividing the range from Level 5 to the power supply voltage Vcc so that a signal at Level 1 is output when a user presses the operating element 61 with a weak force and the level of the output signal increases to Levels 2–5 with increasing pressing force.

The level correction unit 731 corrects the upper and lower limits of the output of the pressure-sensitive resistor 65 to calibrated levels, respectively, before performing the above-described setting of the signal levels. In the present embodiment, the level correction unit 731 supplies a control signal to the variable resistors 71 to adjust the resistance of the variable resistors 71 thereby correcting the output level of the pressure-sensitive resistor 65. More specifically, the maximum and minimum output levels of the pressure-sensitive resistor 65 are corrected on the basis of the maximum and minimum values of the variable resistors 71, and the respective output levels are then determined between the maximum and minim levels.

The signal level detected by the microcomputer 73 is then converted to a digital signal by the A/D converter 732. The resultant digital signal is output to the main unit 3. In the analog-to-digital conversion performed by the AID converter 732, digital values are properly assigned to signal levels from Level 1 to Level 5. For example, in the case where the signal is converted to a digital signal within a range from 0x00 to 0x9f, Level 1 is assigned to a range from 0x00 to 0x1f, Level 2 to a range from 0x20 to 0x3f, Level 3 to a range from 0x40 to 0x5f, Level 4 to a range 0x60 to 0x7f, and Level 5 to a range from 0x80 to 0x9f such that the digital output signal increases with increasing input signal from Level 1 to Level 5.

Figure 12:
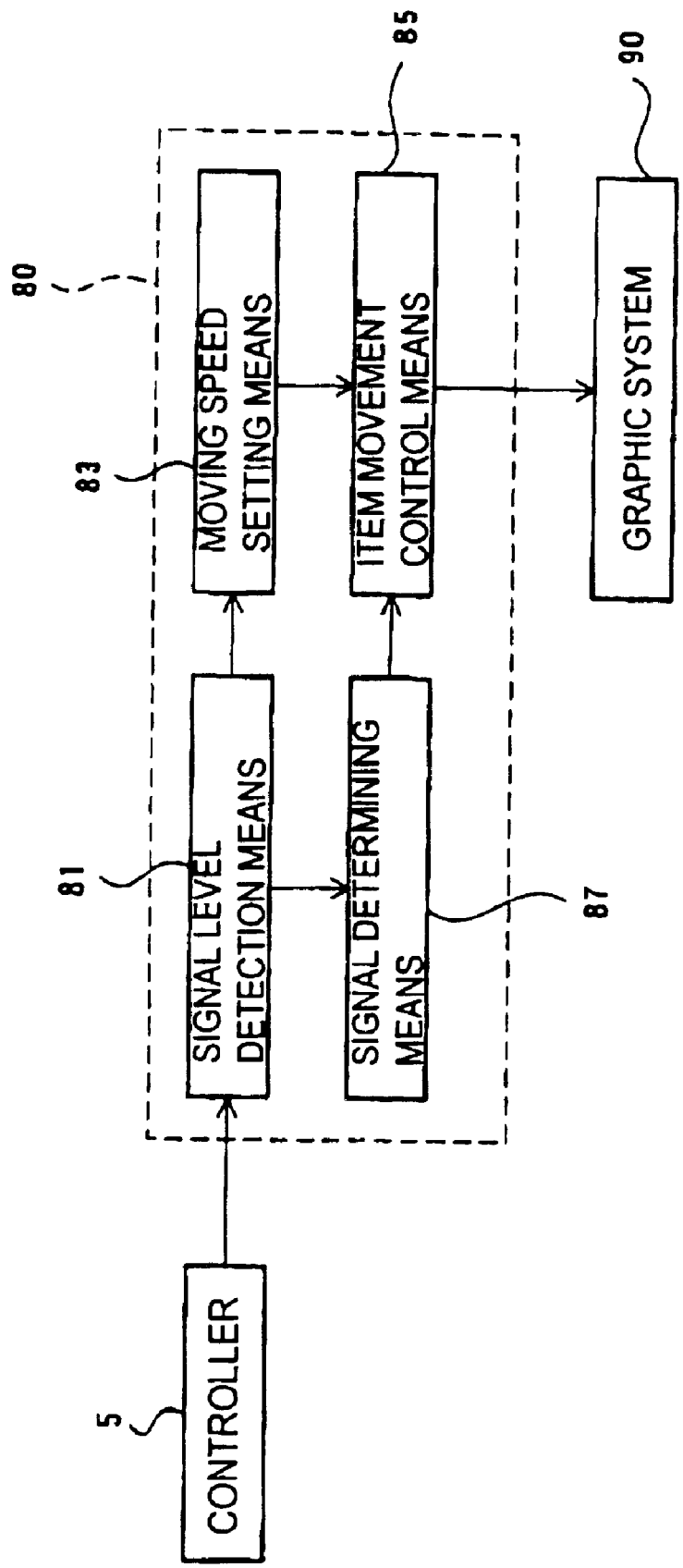
FIG. 12 is a block diagram illustrating a program for implementing the method of moving the position indicating item according to the embodiment of the invention.

The digital signal output from the controller 5 is applied to the CPU of the main unit 3 of the video game machine via the communication controller and processed by the CPU in accordance with the game program. More specifically, as shown in FIG. 12, the CPU 80 includes signal level detecting means 81, moving speed setting means 83, item movement control means 85, and signal determining means 87, implemented by the game program read by the disk drive 32.

The signal level detection means 81 detects the signal level of the digital output signal received from the controller 5 and determines which one of Level 1 to Level 5 the digital signal has.

The moving speed setting means 83 sets the moving speed of the position indicating item such as cursor in accordance with the signal level detected by the signal level detection mend 81. More specifically, if a particular signal level is detected, the moving speed setting means 83 refers to a table presenting the correspondence between the signal level and the moving speed of the position indicating item and sets the moving speed of the position indicating item. There are a plurality of tables depending upon the number of options displayed on a menu screen. When a menu includes a very large number of options, a table is described such that the moving speed of the position indicating item is changed by a large ratio in response to a change in the signal level. Conversely, when a menu includes a small number of options, a table is described such that the moving speed of the position indicating item is changed by a small ratio in response to a change in the signal level.

The item movement control means 85 outputs a control signal thereby moving the position indicating item at the moving speed set by the moving speed setting means 83. The control signal output by the item movement control means 85 is applied to the graphic system. In accordance with the received control signal, the graphic system moves the position indicating item such as the cursor.

The signal determining means 87 determines whether the signal having one of five levels from Level 1 to Level 5 detected by the signal level detection means 81 should be converted to a two-level signal. More specifically, when a menu includes only two options or a similar small number of options, the signal determining means 87 determines that the signal level detected by the signal level detection means 81 should be converted to one of two levels. The conversion to a two-level signal may be performed by employing Level 1 or Level 2 as a threshold value. For example, when the signal received from the controller 5 is lower than the threshold value, it is determined that the pressing force applied to the pressure-sensitive resistor 65 is small and thus it is determined that the switch is not turned on by a user. Conversely, when the signal received from the controller 5 is higher than the threshold value, it is determined that the pressing force applied to the pressure-sensitive resistor 65 is large and thus it is determined that the switch is turned on by the user. This allows switches formed of the pressure-sensitive resistor 65 of the controller 5 to functions as a normal digital switch having only on and off states.

A method of controlling the movement of the position indicating item according to the game program is described below with reference to the flow chart shown in FIG. 13.

When a digital signal is output by the controller 5 in response to an operation performed by a user, the signal level of the digital signal is detected by the signal level detection means 81 (step S1: signal level detection step).

The signal determining means 87 determines whether the above signal should be converted to a two-level signal on the basis of the signal level detected by the signal level detection means 81 and also on the base of the number of menu options to be selected with the position indicating item.

Figure 14:
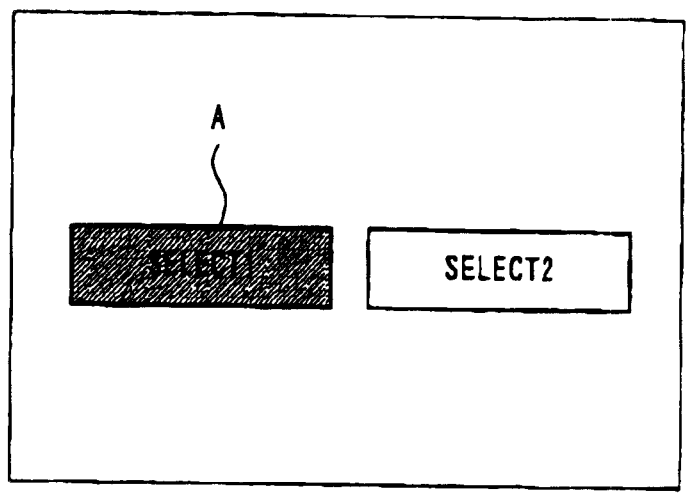
FIG. 14 is a schematic diagram illustrating an example of a menu screen including options to be selected with the position indicating item according to the embodiment of the present invention.

If the menu includes a small number of options to be selected with the position indicating item as is the case in an example shown in FIG. 14, the signal determining 87 determines that the moving speed is not required to be changed and further determines whether the signal received from the controller 6 is higher than the threshold value (step S3). The item movement control means 85 outputs a control signal thereby controlling the movement of the position indicating item such that it is moved in a digital fashion (step S5: item movement control step).

Figure 15:
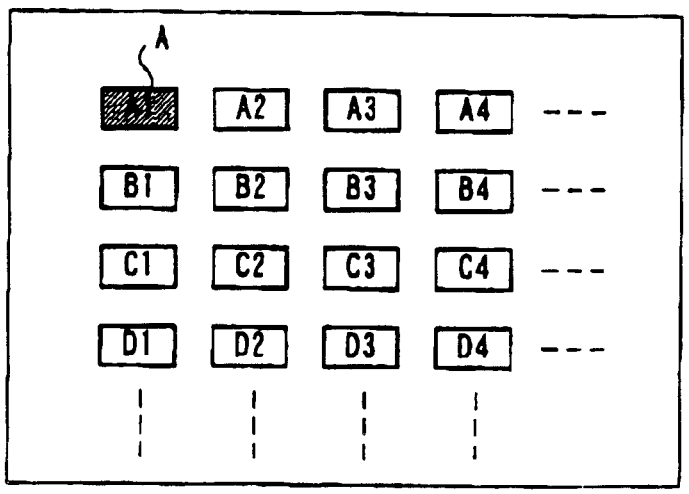
FIG. 15 is a schematic diagram illustrating another example of a menu screen including options to be selected with the position indicating item according to the embodiment of the present invention.

When the menu includes a large number of options to be selected with the position indicating item as is the case in an example shown in FIG. 15, the signal determining means 87 determines that the moving speed should be changed. In response, the moving speed setting means 83 sets the moving speed (step S4: moving speed setting step). The item movement control means 85 outputs a control signal so as to control the movement of the position indicating item at the moving speed specified by the moving speed setting means 83 (step S5).

In accordance with the control signal output by the item movement control means 85, the position indicating item A is moved on the screen shown in FIG. 14 or 15, from one option to another, at the specified moving speed.

The above-described embodiment has various advantages as described below.

That is, because the signal level of the signal output by the controller 5 including the pressure-sensitive resistors 65 is detected in step SI (signal level detection step) and the moving speed of the position indicating item A is determined in step S4 depending upon the signal level detected in step S 1, it is possible to quickly move the position indicating item A in step S5 (item moving step) by changing the moving speed of the position indicating item A depending upon the pressing force applied to an operation element 61 of the controller 5. This allows simplification of the selection operation using the position indicating item A.

In the process of controlling the movement of the position indicating item A, step S2 determines whether a conversion into a two-level signal should be performed, and, when there are a small number of options as is the case in the example shown in FIG. 14, the moving speed setting step (step F4) is skipped thereby simplifying the process of controlling the movement of the position indicating item A.

Furthermore, because the signal output from the controller S to the main unit 3 of the video game machine is of a digital form, the signal level corresponding to the pressing force applied to the operating element 61 can be precisely detected in the signal level detection step S1, and the position indicating item A can be moved at an adequate moving speed determined in accordance with the pressing force applied to the operating element 61. This makes it possible for a user to use the controller 5 in an easier fashion.

Figure 13:
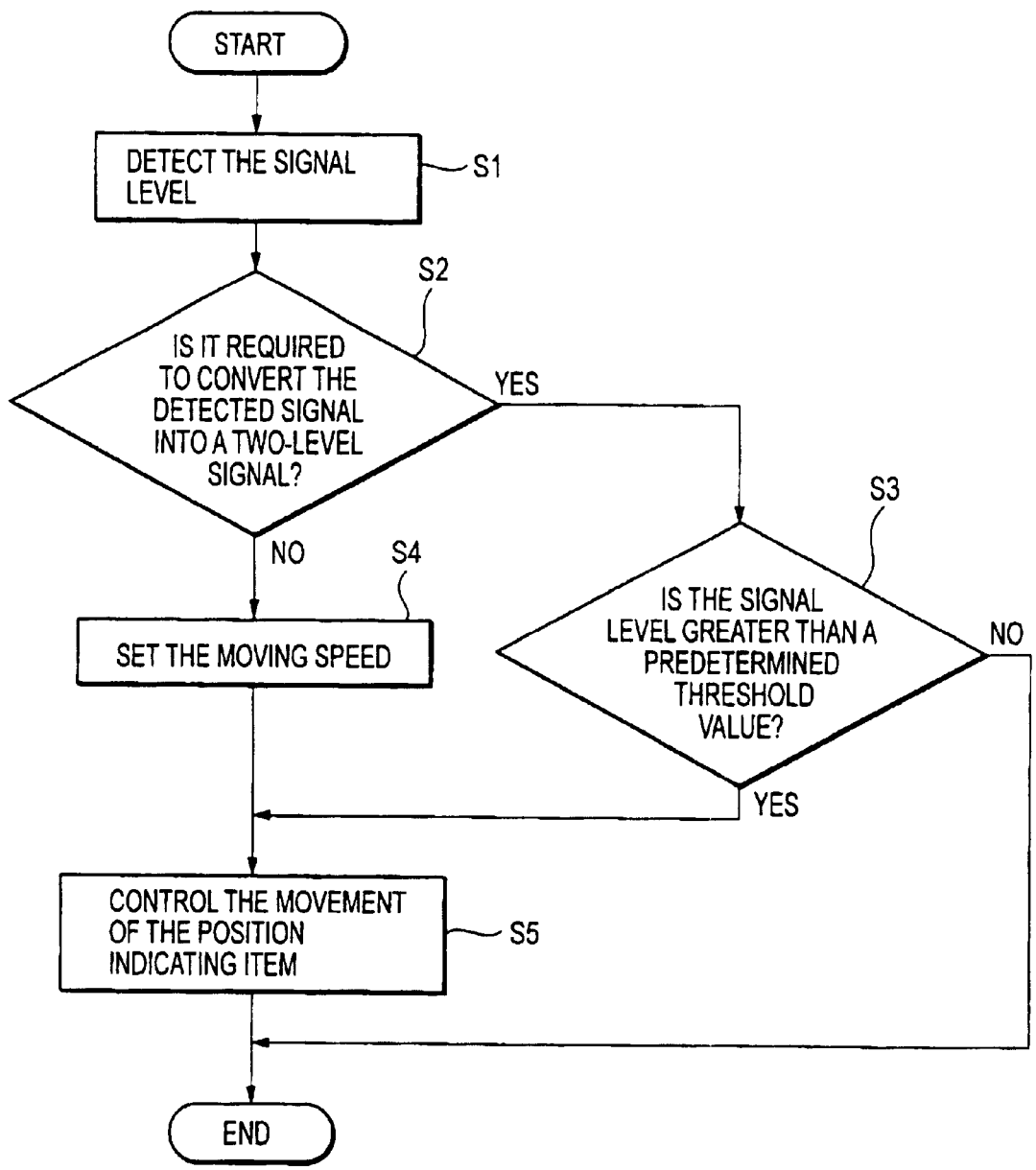
FIG. 13 is a flow chart illustrating the method of moving the position indicating item according to the embodiment of the invention.

A program implementing the method of moving the position indicating item A shown in FIG. 13 may be stored on an optical disk storage medium on which the game program is also stored, so that the present invention may be applied to various combinations of the main unit 3 of the video game machine and the controller 5 which is designed to output various signal levels.

The present invention is not limited to the details of the embodiments described above. It should be understood that various modifications are possible as described below.

For example, although in the embodiments described above, the method of controlling the movement of the position indicating item is implemented by a program stored on an optical disk on which a game program is also stored, the method may also be implemented such that an operating system stored in a ROM disposed in the main unit of the game machine executes the method of controlling the movement of the position indicating item according to the present invention.

Furthermore, although in the embodiments described above, an analog signal is converted to a digital signal in the controller 5 and the resultant digital signal is output from the controller 5, the signal may be output in the form of an analog signal from the controller 5 and the analog signal may be converted to a digital signal in the main unit of the game machine. This allows elimination of the analog-to-digital conversion process performed in the controller, and thus it becomes possible to simplify the internal structure of the controller and reduce the weight of the controller.

As described above, the present invention provides the method of controlling a position indicating item, the storage medium on which a program for implementing the method of controlling a position indicating item is stored, and the electronic device including the program, whereby the level of the signal output by the control means is detected in the signal detection step, and the moving speed of the position indicating item is set in accordance with the detected signal level so that the position indicating item is quickly moved at the moving speed depending upon the pressing force applied by a user to an operating element thereby allowing simplification of the selecting operation using the position indicating item.

Although the present invention have been described above with reference to preferred embodiments, it should be understood that various modifications and changes are possible without departing from the scope of the present invention.

What is claimed is:

1. A method of controlling the movement of a position indicating item displayed on a screen in accordance with an output signal of control means including a pressure-sensitive resistor which outputs a signal whose level varies depending upon a pressing force applied to an operating element, said method comprising:

a signal level detection step for detecting the signal level of the signal output by said control means;

a moving speed setting step for setting the moving speed of the position indicating item displayed on the screen in accordance with the signal level detected in said signal level detection step; and an item moving step for moving said position indicating item at the moving speed set in said moving speed setting step;

wherein the position indicating item is displayed as a visual marking of one of a plurality of sequential menu options and the position indicating item indicates a selection of the marked menu option, wherein the position indicating item moves sequentially from one menu option to a next menu option, one menu option at a time, according to the moving speed set in said moving speed setting step, wherein the moving speed is set according to the number of menu options in the plurality of menu options, such that a larder number of menu options results in a higher moving speed than a smaller number of menu options.

2. A method of controlling the movement of a position indicating item, according to claim 1, wherein said signal output by said control means is a digital signal obtained by converting an analog signal output by said pressure-sensitive resistor.

3. A method of controlling the movement of a position indicating item, according to claim 1, wherein said signal output by said control means is a signal obtained by correcting the upper and lower limits of an analog signal output by said pressure-sensitive resistor to corresponding calibrated levels.

4. A method of controlling the movement of a position indicating item, according to claim 1, said method further comprising a signal determining step following said detection step, wherein said signal determining step determines whether the signal whose signal level has been detected in said signal level detection step should be converted to a two-level signal, in accordance with the number of menu options displayed on the screen.

5. A method of controlling the movement of a position indicating item, according to claim 4, wherein said signal output by said control means is a digital signal obtained by converting an analog signal output by said pressure-sensitive resistor.

6. A method of controlling the movement of a position indicating item, according to claim 4, wherein said signal output by said control means is a signal obtain ed by correcting the upper and lower limits of an analog signal output by said pressure-sensitive resistor to corresponding calibrated levels.

7. A computer-readable medium including a computer-executable program thereon, said program implementing a method of controlling the movement of a position indicating item displayed on a screen in accordance with an output signal of control means including a pressure-sensitive resistor which outputs a signal whose level varies depending upon a pressing force applied to an operating element, said program comprising:

a signal level detection step for detecting the signal level of the signal output by said control means;

a moving speed setting step for setting the moving speed of the position indicating item displayed on the screen in accordance with the signal level detected in said signal level detection step; and an item moving step for moving said position indicating item at the moving speed set in said moving speed setting step;

wherein the position indicating item is displayed as a visual marking of one of a plurality of sequential menu options and the position indicating item indicates a selection of the marked menu option, wherein the position indicating item moves sequentially from one menu option to a next menu option, one menu option at a time, according to the moving speed set in said moving speed setting step, wherein the moving speed is set according to the number of menu options in the plurality of menu options, such that a larger number of menu options results in a higher moving speed than a smaller number of menu options.

8. A computer-readable storage medium including the computer-executable program stored thereon, said program implementing the method of controlling the movement of a position indicating item, according to claim 7, wherein said program further comprises a signal determining step for determining whether the signal whose signal level has been detected in said signal level detection step should be converted to a two-level signal, in accordance with the number of menu options displayed on the screen.

9. An electronic device comprising:

control means including a pressure-sensitive resistor which outputs a signal whose level varies depending upon a pressing force applied to an operating element;

signal level detection means for detecting the signal level of the signal output by said control means;

moving speed setting means for setting the moving speed of the position indicating item displayed on the screen in accordance with the signal level detected by said signal level detection means; and an item moving means for moving the position indicating item at the moving speed set by said moving speed setting means;

wherein the position indicating item is displayed as a visual marking of one of a plurality of sequential menu options and the position indicating item indicates a selection of the marked menu option, wherein the position indicating item moves sequentially from one menu option to a next menu option, one menu option at a time, according to the moving speed set by said moving speed setting means, wherein the moving speed is set according to the number of menu options in the plurality of menu options, such that a larger number of menu options results in a higher moving speed than a smaller number of menu options.

10. An electronic device, according to claim 9, further comprising signal determining means for determining whether the signal whose signal level has been detected by said signal level detection means should be converted to a two-level signal, in accordance with said signal level and the number of options to be selected with said position indicating item.

11. An electronic device, according to claim 9, wherein the conduction characteristic of said pressure-sensitive resistor varies depending upon the applied pressing force.

12. An electronic device, according to claim 9, wherein said pressure-sensitive resistor includes a resistor and conductive element, the contact area between which varies depending upon the applied pressing force.

13. The electronic device according to claim 9, wherein the operating element is adapted to be pushed by an operator.

14. The method of controlling the movement of a position indicating item according to claim 1, wherein the pressing force is applied to the operating element by being pushed by an operator.

15. A method of controlling the movement of a position indicating item displayed on a screen in accordance with an output signal of control means including a pressure-sensitive resistor which outputs a signal whose level varies depending upon a pressing force applied to an operating element, said method comprising:

a signal level detection step for detecting the signal level of the signal output by said control means, wherein the detected signal level is one of three or more available signal levels;

a signal determining step for determining, when one of options displayed on the screen is selected by moving said position indicating item, whether the signal whose signal level has been detected in said signal level detection step should be converted to a two-level signal, in accordance with the number of options displayed on the screen;

a moving speed setting step for setting the moving speed of the position indicating item displayed on the screen in accordance with the signal level detected in said signal level detection step; and an item moving step for moving said position indicating item at the moving speed set in said moving speed setting step;

wherein, in said signal determining step, the signal whose signal level has been detected in said signal level detection step is to be converted to a two-level signal if the number of options displayed on the screen is below a threshold number.

16. A method of controlling the movement of a position indicating item displayed on a screen in accordance with an output signal of control means including a pressure-sensitive resistor which outputs a signal whose level varies depending upon a pressing force applied to an operating element, said method comprising:

a signal level detection step for detecting the signal level of the signal output by said control means;

a moving speed setting step for setting the moving speed of the position indicating item displayed on the screen in accordance with the signal level detected in said signal level detection step; and an item moving step for moving said position indicating item at the moving speed set in said moving speed setting step;

wherein said moving speed setting step includes selecting one of a plurality of moving speed tables, each moving speed table indicating one or more moving speeds for respective signal level ranges, determining a target moving speed by determining the moving speed corresponding to the detected signal level in the selected moving speed table, and setting the moving speed to the target moving speed.

17. The method of controlling the movement of a position indicating item according to claim 16, wherein said screen is set to a current display resolution, the plurality of moving speed tables includes a first moving speed table corresponding to a first display resolution and a second moving speed table corresponding to a second screen resolution, and selecting a moving speed table includes selecting a moving speed table that corresponds to the current display resolution of the screen.

* * * * *